(12) United States Patent
Shivanna et al.

(10) Patent No.: US 10,360,370 B2
(45) Date of Patent: Jul. 23, 2019

(54) AUTHENTICATED ACCESS TO MANAGEABILITY HARDWARE COMPONENTS

(71) Applicant: Hewlett Packard Enterprise Development LP, Houston, TX (US)

(72) Inventors: Suhas Shivanna, Karnataka (IN); Srinivasa Ragavan Rajagopalan, Karnataka (IN); Nagaraj S Salotagi, Karnataka (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 258 days.

(21) Appl. No.: 15/592,528

(22) Filed: May 11, 2017

(65) Prior Publication Data
US 2018/0025150 A1  Jan. 25, 2018

(30) Foreign Application Priority Data

Jul. 22, 2016 (IN) .............................. 201641025137

(51) Int. Cl.
*G06F 9/32* (2018.01)
*G06F 21/44* (2013.01)
(Continued)

(52) U.S. Cl.
CPC ............ *G06F 21/44* (2013.01); *G06F 9/4403* (2013.01); *G06F 21/572* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,915,080 A * 6/1999 Park ..................... G11C 16/102
714/6.1
6,349,336 B1  2/2002 Sit et al.
(Continued)

*Primary Examiner* — Zahid Choudhury
(74) *Attorney, Agent, or Firm* — Hewlett Packard Enterprise Patent Department

(57) ABSTRACT

Examples include an authenticated access to manageability hardware components in a computing device. Some examples enumerate manageability hardware components connected to an operative system kernel of the computing device, the manageability hardware components comprising a bus configuration space and the bus configuration space comprising memory map registers. Some examples include encoding an address stored in the memory map registers of each of the manageability hardware components to produce encoded address to control unauthorized accesses and locks the bus configuration space of each manageability hardware component by setting a read-only attribute to the bus configuration space. Some examples reprogram, in response to a request for access of an authenticated OS component to a manageability hardware component, the memory map register of the requested manageability hardware component with an accessible address to provide the authenticated OS component with access to the manageability hardware component.

15 Claims, 6 Drawing Sheets

(51) Int. Cl.
  *G06F 21/57*   (2013.01)
  *H04L 9/32*   (2006.01)
  *G06F 9/4401*   (2018.01)
  *G06F 21/62*   (2013.01)
  *G06F 21/85*   (2013.01)

(52) U.S. Cl.
  CPC ........ *G06F 21/575* (2013.01); *G06F 21/6218* (2013.01); *G06F 21/85* (2013.01); *H04L 9/3247* (2013.01); *G06F 2221/033* (2013.01); *G06F 2221/2149* (2013.01)

(58) Field of Classification Search
  CPC ....... G06F 1/3289; G06F 1/266; H04L 12/12; H04L 12/10
  See application file for complete search history.

(56) References Cited

U.S. PATENT DOCUMENTS

| | | | |
|---|---|---|---|
| 8,015,395 B1* | 9/2011 | Lewis | G06F 1/305 360/101 |
| 8,190,720 B1* | 5/2012 | Yellai | H04L 67/34 709/221 |
| 2006/0190722 A1* | 8/2006 | Sharma | G06F 21/6209 713/165 |
| 2007/0180512 A1* | 8/2007 | Chaudhuri | H04L 63/029 726/12 |
| 2013/0054946 A1* | 2/2013 | Thom | G06F 21/575 713/2 |

\* cited by examiner

AUTHENTICATED ACCESS TO MANAGEABILITY HARDWARE COMPONENTS

BACKGROUND

Nowadays, cyber-attacks to computing systems, including Permanent Denial-of-Service (PDoS) attacks and Operative Systems (OS) attacks, are continuously increasing. Operative Systems of the computing devices have access to many of the manageability hardware components over computer bus systems, e.g., Peripheral Component Interconnect Express (PCIe) bus system. Said manageability hardware components are those components required to manage and control the computing device, said computing devices being for example a computer, a server, etc. Examples of manageability hardware components that are accessible by the OS are serial bus based hardware used for communicating with manageability firmware components, Non-Volatile Random-Access Memory (NVRAM) containing critical platform and firmware data, etc. The manageability hardware components are accessible to OS malware, root kits and badly written/misbehaving device components, e.g., drivers, applications, etc., that may exploit known vulnerabilities in the design and code used to program and communicate these components to damage and potentially destroy hardware components of the computing device.

BRIEF DESCRIPTION OF THE DRAWINGS

The following detailed description references the drawings, wherein.

DETAILED DESCRIPTION

Figure 1:
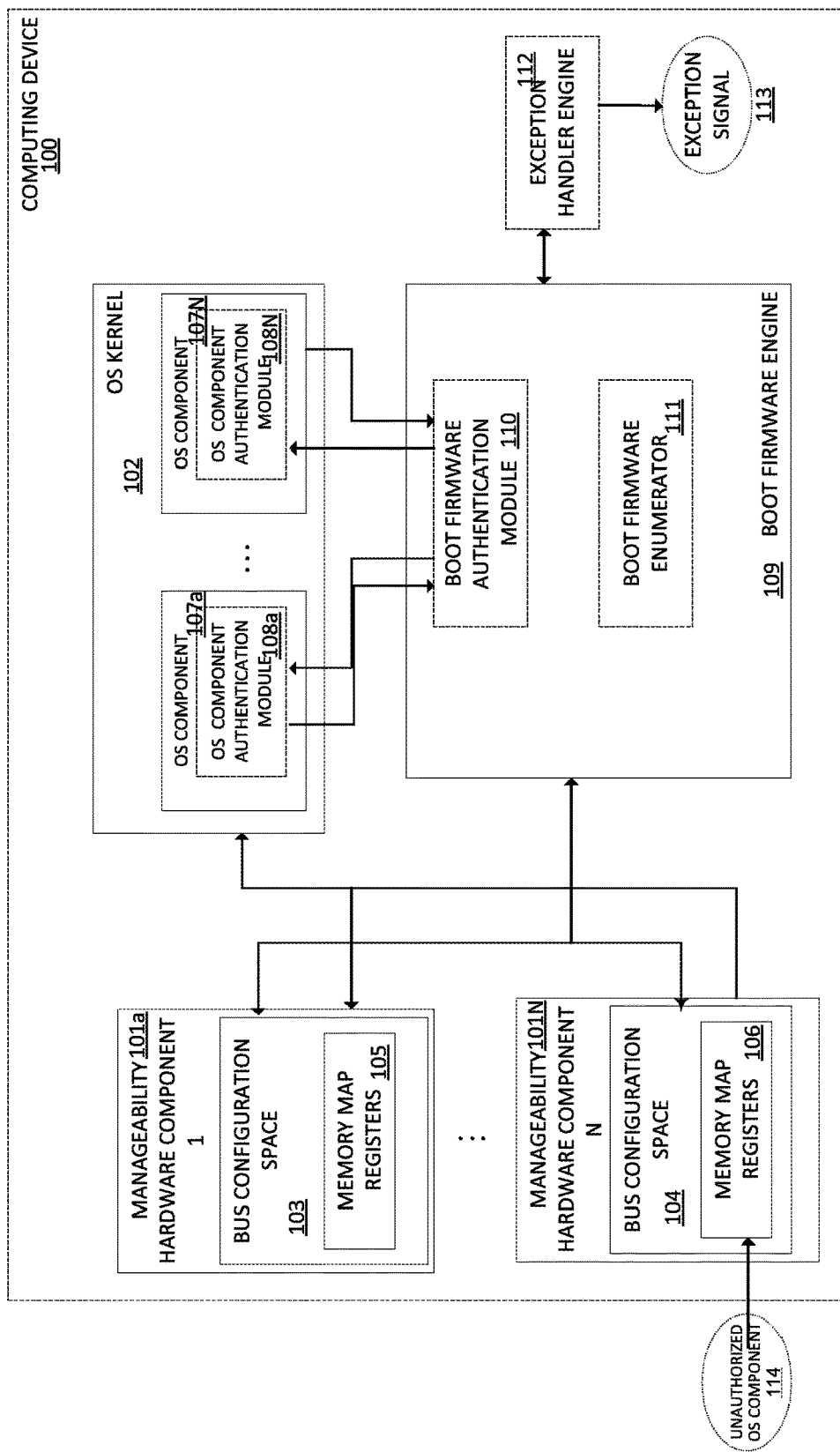
FIG. 1 is a block diagram of an example authenticated access to the manageability hardware components of a computing device.

In computing, a Permanent Denial-of-Service (PDoS), also known as phlashing, is an attack that damages a computing system in such an important manner that it requires a replacement of hardware components of said system. Other OS attacks may also critically damage the core hardware and the platform software components of the computing system. The manageability hardware subsystem is one the key subsystems in computing systems and any PDoS attack or OS attack that exploits known vulnerabilities in the design and code used to program and communicate using these devices could lead to the replacement of the complete hardware, resulting in cost increases and downtime to users.

During a normal boot, the boot firmware engine of the computing device, the boot firmware engine being operated by a boot firmware such as the BIOS or the United Extensible Firmware Interface (UEFI), enumerates the manageability hardware components, assigns a configuration address space to each one of the enumerated manageability hardware components and programs the computer bus system configuration address space of said manageability hardware components by assigning a proper address to the memory map registers of the manageability hardware components to allow access to the OS to said manageability hardware components. This programmed computer bus system configuration address space and the proper assigned address of each manageability hardware component are stored in an internal memory of the device, for example in a botting firmware memory. Since the computer bus system configuration address space of the manageability hardware components is accessible, it may be read and write, to the OS during the booting process or during runtime of said hardware components, other unauthorized components, e.g., badly written/misbehaving drivers and malware with kernel privileges, could access to this configuration address space and create a PDoS attack by corrupting data that is required for booting and proper operation of the computing device.

Other auxiliary hardware devices, e.g., Electrically Erasable Programmable Read-Only Memory (EEPROM), Voltage Regulator Modules (VRMs) and temperature sensors attached to low speed Inter-Integrated Circuits (I2C) bus or Serial Peripheral bus (SPI), that are accessible from the host processor and OS of the computing device are critical devices for the proper operation of the computing device. These auxiliary hardware devices, can be also considered as manageability hardware components of the computing device and also need to be protected from PDoS attacks.

Thus, it may be desirable to provide a solution that protect the manageability hardware components of a computing device from unauthorized accesses by PDoS attacks, OS malwares, root kits and badly written/misbehaving device components during the booting process and during runtime of the computing devices by authorizing on-demand access to the manageability hardware components to those OS components previously verified and authorized by the boot firmware engine of the computing device.

To address these issues, examples described herein may include an authenticated access to manageability hardware components wherein the boot firmware engine of the computing device detect the topology of the manageability subsystem comprising all the manageability hardware components connected to the OS kernel of the computing device by enumerating them. These manageability hardware components have a computer bus system configuration address space, hereinafter referred to as bus configuration space, to connect with the OS kernel and the bus configuration space has memory map registers to map these manageability hardware components. These memory map registers store an address that is encoded by the boot firmware engine producing an encoded address. A random key, which may be created at every boot, may be used by the boot firmware engine to produce the encoded address of the memory map registers. The bus configuration space of each manageability hardware component is then locked by the boot firmware engine setting a read-only or a hide attribute. In this way, any access from unauthorized OS components or OS malware to modify the bus configuration spaces and take control of the manageability hardware components is avoided. Once any of the components of the OS, such as drivers, applications, utilities, etc., is verified and authenticated by an authenticator engine of the boot firmware engine, the boot firmware engine unlocks the bus configuration space of the manageability hardware component requested by the OS component, reprograms the encoded memory map register addressing this manageability hardware component with a proper address and relocks its bus configuration space. This provides access to the manageability hardware component using the reprogrammed memory map register to the authenticated OS component. The proper address is an address that allows direct access to the authorized OS component to the manageability hardware component allowing retrieving the bus configuration space from the memory map register of the hardware component. The manageability hardware components that have not been requested to be accessed by authorized OS components remain protected against attacks with locked and encoded bus configuration spaces. The OS component authentication process may be implemented in the authenticator engine of the boot firmware engine: by using a digital signed nonce generated by the boot firmware engine using a trusted public and private key; by using a platform specific shared secret key; or by verifying a signature of the OS component loaded in memory using a public key stored in the boot firmware authentication module of the boot firmware engine. The memory where the signature of the OS component is loaded may be a system RAM/OS managed memory where the OS component is loaded. This memory may be different from the boot firmware memory that is not visible to the OS.

In examples described herein, the boot firmware engine may directly program the memory map registers by encoding the addresses stored in the memory map registers producing encoded addresses or may program the memory map registers with proper addresses generated during the enumeration process, then may produce encoded addresses and reprogram the memory map registers with the encoded addresses and may save the proper addresses in an internal memory, for example in the boot firmware memory. These proper addresses may be used to reprogram the memory map registers of those manageability hardware components to which access is requested by authorized OS components.

In examples described herein, the authenticated access to manageability hardware components may also provide an exception handler engine that generates exceptions when OS malware or unauthorized OS components try to access and write to the manageability hardware components by using their respective locked and encoded memory map registers. In response to the attempt to access the encoded memory map register, the exception handler engine may send a message reporting the writing operation to the manageability hardware component and logging an event through a management processor of the computing device. The management processor may process the event and send it out through the management network.

The exception handler engine may also inform the user of the computing device of the attempt to access the manageability hardware component and provide information about the OS malware or unauthorized OS component that has attempted to access.

As used herein, a "computing device" may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices.

As used herein, the boot firmware engine of the computing device may be any combination of hardware and programming to implement the functionalities of a boot firmware such as the BIOS or the United Extensible Firmware Interface (UEFI). In some examples, the functionalities of the boot firmware engine may be at least partially implemented in the form of electronic circuitry.

For purposes of illustration, the example of FIG. 1 will be explained in relation to an authenticated access to manageability hardware components in a computing device 100. The computing device 100 comprises at least one manageability hardware component 101a-101N that may be, e.g., serial bus based hardware used for communicating manageability firmware components, NVRAM containing critical platform and firmware data, NAND partitions storing firmware data, etc., that are accessible by the OS during the booting process of the computing device 100 and during runtime of the hardware components 101a-101N. Each one of the manageability hardware components 101a-101N comprises a bus configuration space 103-104 that is used by a computer bus system, such as the PCIe bus system, to communicate with the OS kernel 102 of the computing device 100. In turn, the bus configuration space 103-104 of each manageability hardware component 101a-101N comprises memory map registers 105-106 through which the OS components 107a-107N, such as OS drivers, OS application or OS utilities that are run on-demand, may access the manageability hardware components 101a-101N. Each one of the OS components 107a-107N comprises a corresponding OS component authentication module 108a-108N that communicates with a boot firmware authentication module 110 in the boot firmware engine 109 of the computing device 100 to verify and authenticate the OS components 107a-107N. The boot firmware engine 109 also comprises a boot firmware enumerator 111 that carry out an enumeration process to identify the topology of the manageability hardware subsystem that includes all the manageability hardware components 101a-101N. During the enumeration process, the boot firmware engine 109 may store a list of addresses pointing to the memory map registers 105-106 of the enumerated manageability hardware components 101a-101N, said manageability hardware components 101a-101N being accessible to the OS components 107a-107N, in an internal device memory, for example in the boot firmware memory, that is accessible only for the boot firmware engine 109. Once the enumeration process is complete, the boot firmware engine 109 may check the addresses pointing to the memory map registers 105-106 of the enumerated manageability hardware components 101a-101N and reprogram the addresses of the memory map registers 105-106 to an encrypted, encoded or transposed address using a random key that is generated at every booting process.

The manageability hardware components 101a-101N may also comprise registers (not shown in the figure), for example architected registers, to set attributes to hardware features that are mapped to the memory map register of the bus configuration spaces 103-104. The architected registers are programmable registers that are architected for the purpose of controlling access to a specific functionality of the particular manageability hardware component. These attributes, that are stored in the memory map register 105-106 of each manageability hardware components 101a-

101N, may be Read-Only, Read/Write or Hide. The attributes may be used to lock the bus configuration space 103-104 of the manageability hardware components 101a-101N by setting the attributes as Read-Only or Hide. These registers may be modified only by the boot firmware engine 109 through a secured way, for example, using a System Management Mode (SMM) in x86 processors or using passwords controlled by the boot firmware engine 109.

The modification of the bus configuration spaces 103-104 is blocked by setting their attributes to Read-Only or Hide on the manageability hardware components 101a-101N. Any writing operation to this encrypted/transposed/obfuscated bus configuration spaces 103-104, will result in a system exception.

The boot firmware authentication module 110 provides a secured access for OS components to the manageability hardware components 101a-101N. This boot firmware authentication module 110 provides a method for OS components 107a-107N to register and authenticate themselves as reliable OS components. The OS components 107a-107N register and authenticate themselves, via their respective OS component authentication modules 108a-108N with the boot firmware authentication module 110, using a digital signed nonce generated by the boot firmware engine 109 using a trusted public and private key or using a platform specific shared secret key. The interaction between the OS component authentication module 107a-107N and the boot firmware authentication module 110 may be carried out by means of run time interfaces that may be accessed by OS using a table like interface that points to the boot firmware authentication module 110. The boot firmware signature validation can be also performed by loading the OS module in memory and the pointer containing the loaded OS component is passed as an input to the boot firmware authentication module 110, which verifies the signature of the OS component loaded in memory using a public key stored in the boot firmware authentication module 110.

Once one of the OS components 107a-107N, for example OS component 107a, request access to one of the manageability hardware components 101a-101N, for example manageability hardware component 101a, and the boot firmware authentication module 110 verifies and authenticates the OS component 107a, the boot firmware engine 109 may unlock the bus configuration space 103 of the manageability hardware component 101a by setting its attribute as Read/Write, re-program the memory map registers 105 with a proper address that was stored during the enumeration process and re-lock the bus configuration space 103 by setting its attribute as Read-Only or Hide. This may provide full access to the manageability functions of the manageability hardware component 101a to the authorized OS component 107a.

The system 100 also comprises an exception handler engine 112 that may generate an exception signal 113 in response to a writing operation of an unauthorized OS component 114 attempting to access any of the encoded memory map registers 105-106. The exception handler engine 112 may be part of the of the boot firmware engine 109 or may be implemented outside the boot firmware engine, for example, in other hardware or a management processor. When OS malware or any unauthorized OS component 114 tries to write the memory map register 106 of the bus configuration space 104 of the manageability hardware component 101N using its encoded address, an exception signal 113 may be raised. This exception handler engine 112 may also send a message to the manageability hardware component 101N reporting the unauthorized attempt to access and log an event through a management processor of the computing device 100, in addition to informing the user of the unauthorized attempt to access by the specific unauthorized OS component 114.

Figure 2:
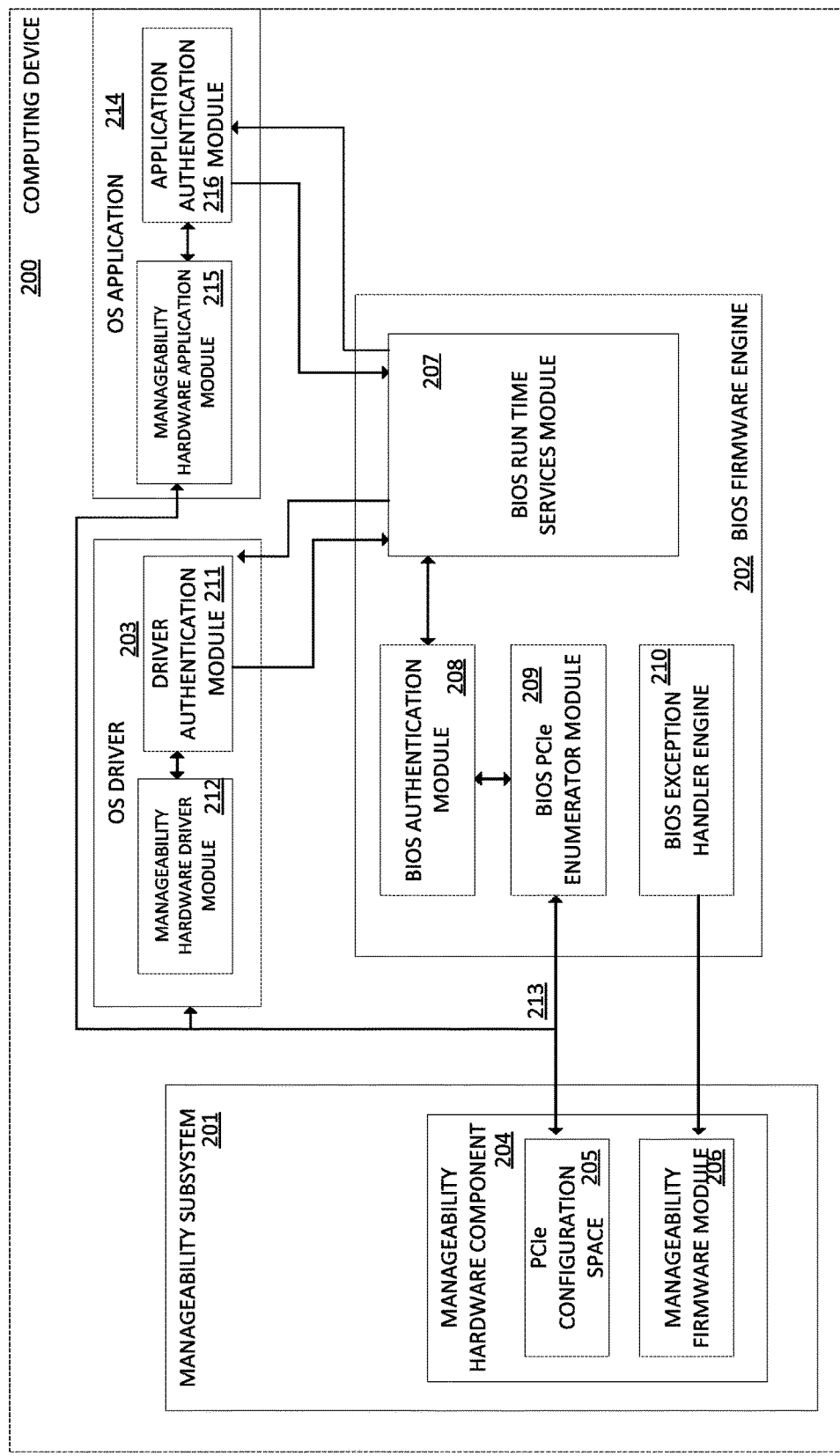
FIG. 2 is a block diagram of another example authenticated access to the manageability hardware components of a computing device, including a Basic Input Output System (BIOS) run time services module and a BIOS PCIe enumerator module.

FIG. 2 is a block diagram of another example authenticated access to the manageability hardware components of a computing device, including a BIOS Run Time Services Module providing access to the BIOS authentication functionality and a BIOS PCIe Enumerator module.

In such as example, the computing device 200 comprises a manageability hardware subsystem 201 having one or more manageability hardware components. In this example and for clarity reasons one single manageability hardware component 204 is shown. This manageability hardware component 204 may be a Non-Volatile Random-Access Memory (NVRAM) containing critical platform and firmware data, NAND partitions storing firmware data, etc., that is accessible by the OS during the booting process of the computing device 200. The manageability hardware component 204 comprises a PCIe configuration address space 205, hereinafter referred to as PCIe configuration space 205, that is used by the PCIe bus system 213 to communicate with a OS driver 203 and an OS application 214 that are contained in the OS kernel (not shown in the figure) of the computing device 200. The OS kernel may comprise other OS components such as other OS drivers, OS applications or OS utilities that are run by the OS kernel on demand. The PCIe configuration space 205 comprise Base Address Registers (BARs) (not shown in the figure) through which the OS driver 203 and the OS application 214 access the manageability hardware component 204. The manageability hardware component 204 also comprises a manageability firmware module 206 that provides control, monitoring and data manipulation of said manageability hardware components 204.

The OS driver 203 comprises a manageability hardware driver module 212 that manages and monitors data received from the manageability hardware component 204 via the PCIe bus system 213 and a driver authentication module 211 that communicates with the boot firmware engine 202 of the computing device 200. The OS application 214 also comprises a manageability hardware application module 215 that manages and monitors data received from the manageability hardware component 204 via the PCIe bus system 213 and an application authentication module 216 that communicates with the boot firmware engine 202 of the computing device 200. The respective driver authentication module 211 and the application authentication module 215 send a respective digital signature of the OS driver 203 and OS application 214 to the BIOS run time services module 207 of the BIOS firmware engine 202 that verifies said digital signature. The OS component 203,214 may be authenticated using a combination of a nonce generated by BIOS firmware engine 202 and digital signature using a trusted private and public key pair. The BIOS signature validation can be also performed by loading the module in memory and the pointer passed as an input to the BIOS run time services module 207.

The BIOS firmware engine 202 also comprises a BIOS PCIe enumerator module 209 that carry out an enumeration process to identify the topology of the manageability hardware subsystem 201. During the enumeration process, the BIOS firmware engine 202 may store the addresses pointing to the BARs of the enumerated manageability hardware component 204 in an internal device memory, for example a BIOS firmware memory, that is accessible only for the BIOS firmware engine 202. Once the enumeration process is complete, the BIOS firmware engine 202 may check the addresses pointing to the BARs of the enumerated manageability hardware component 204 and reprogram the addresses of the BARs to an encrypted, encoded or transposed address using a random key that is generated at every booting process.

The manageability hardware component 204 comprises an architected register (not shown in the figure) to set attributes to the PCIe configuration space 205. This attribute may be Read-Only, Read/Write or Hide. The attribute may be utilized to lock the PCIe configuration space 205 of the manageability hardware component 204 by setting the attribute as Read-Only or Hide. This register can be modified only by the BIOS authentication module 208 such that the PCIe configuration space 205 is blocked against any attempt to write it. Any writing operation to this encrypted/transposed/obfuscated address, will result in a system exception.

The BIOS authentication module 208 provides a secured access for the OS component 203 to the manageability hardware subsystem 201. This BIOS authentication module 208 provides a method for OS components 203,214 to register and authenticate as reliable OS components. When the OS driver 203 or the OS application 214 registers itself by using the respective OS component authentication module 211,215 with the BIOS authentication module 208 through the BIOS run time services module 207, the OS component 203,214 can be authenticated using a digital signed nonce generated by the BIOS firmware engine 202 using a trusted public and private key or using a platform specific shared secret key. The BIOS signature validation can be also performed by loading the module in memory and the pointer passed as an input to the BIOS run time services module 207.

Once the OS driver 203 or the OS application 214 requests access to the manageability hardware component 204 and the BIOS run time services module 207 and the BIOS authentication module 208 verify and authenticate the corresponding OS driver 203 and OS application 214, the BIOS authentication module 208 may unlock the PCIe configuration space 205 of the manageability hardware component 204 by setting its attribute as Read/Write, reprogram the BARs with proper addresses that were stored during the enumeration process and re-lock the PCIe configuration space 205 by setting its attribute as Read-Only or Hide. This provides full access to the manageability functions of the manageability hardware component 204 to the authorized OS driver 203 and OS application 214.

In such example, the BIOS firmware engine 202 also comprises a BIOS exception handler engine 210 that may generate an exception signal in response to a writing operation of an unauthorized OS component attempting to access to one of the encoded BARs. When OS malware or any unauthorized OS component tries to write the PCIe configuration space 205 of the manageability hardware component 204 using its encoded address, an exception signal may be raised. Only the previously authorized and verified OS driver 203 and OS application 214 have access to this manageability hardware component 204, remaining locked for the rest of OS components of the computing device, OS malwares or unauthorized external entities. This BIOS exception handler engine 210 also sends a message to the manageability firmware module 206 of the manageability hardware component 204 reporting the unauthorized attempt to access and log an event through a management processor of the computing device 200, in addition to informing the user of the unauthorized attempt to access by the specific unauthorized OS component or OS malware.

Figure 3:
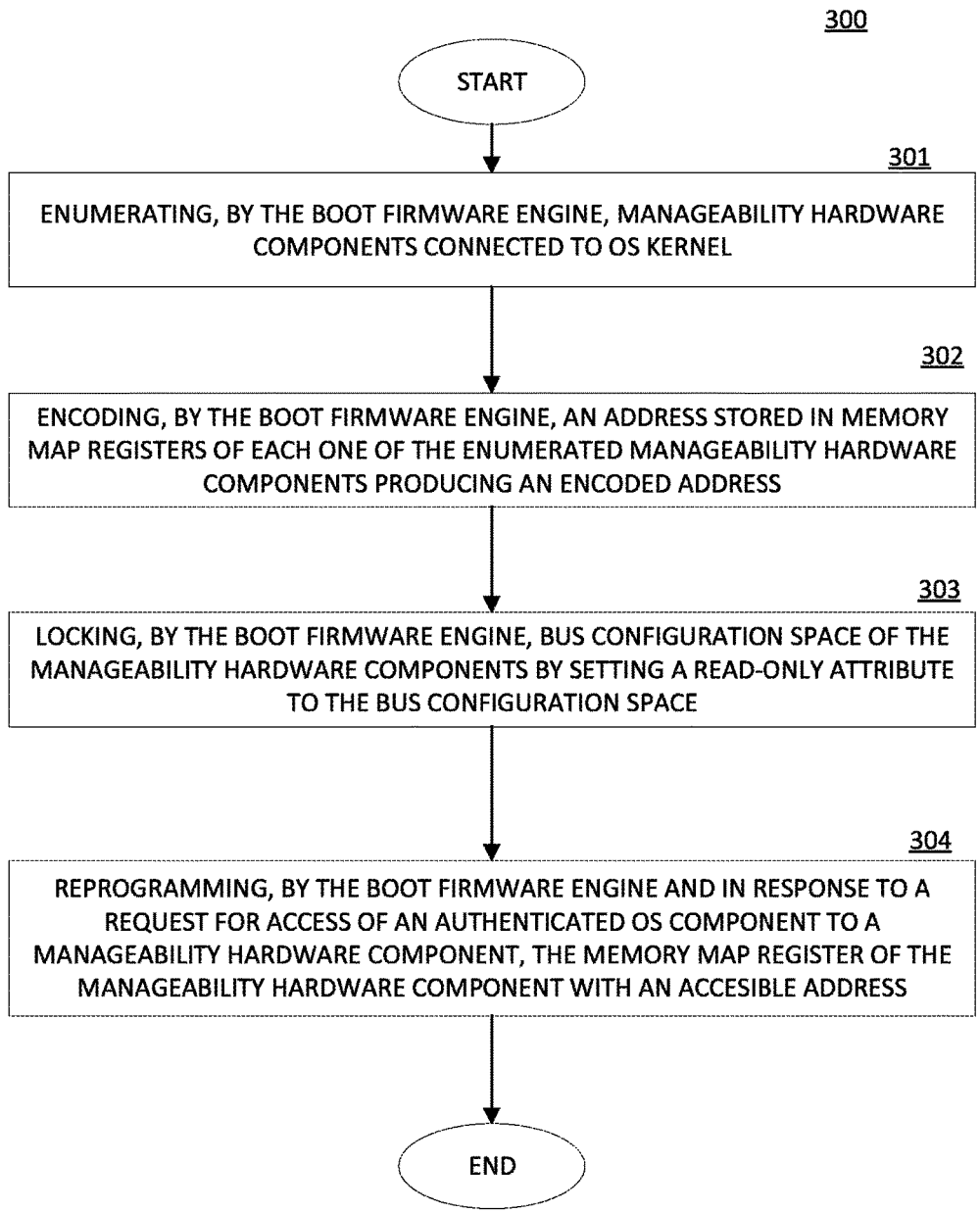
FIG. 3 is a flowchart of an example method to authenticated access to the manageability hardware system of a computing device including encoding the memory map registers of the manageability hardware components with an encoded address.

FIG. 3 is a flowchart of an example method to authenticated access to the manageability hardware system of a computing device including encoding the memory map registers of the manageability hardware components with an encoded address. Although execution of method 300 is described below with reference to computing device 100 of FIG. 1, other suitable systems for the execution of method 300 may be utilized (e.g., the computing device 200 of FIG. 2). Additionally, implementation of method 300 is not limited to such examples.

At 301 of the method 300, the boot firmware engine 109 enumerates the manageability hardware components 101a-101N which are connected to the OS kernel 102 of the computing device 100 through a computer bus system, such the PCIe bus system. This enumeration process 301 detects the topology of the manageability subsystem that may be parsed to identify those manageability hardware components that need to be protected. In some examples, all the manageability hardware components of the manageability subsystem need to be protected but in other examples, only part of the manageability hardware components need to be protected. The boot firmware engine 109 encodes 302 the memory map registers 105-106 of the manageability hardware components that need to be protected by encoding an address stored in said memory map registers 105-106 of the enumerated manageability hardware components 101a-101N to produce an encoded address. A random key, which may be created at every boot, may be used by the boot firmware engine 109 to encode the memory map registers 105-106. Then, the boot firmware engine 109 locks 303 the bus configuration spaces 103-104 of the manageability hardware components 101a-101N by setting a Read-Only or a Hide attribute to said bus configuration spaces 103-104. In this way, the bus configuration spaces 103-104 of the manageability hardware components 101a-101N remain locked to accesses from unauthorized OS components or OS malware that try to take control of the manageability hardware components 101a-101N. After that, the boot firmware engine 109, in response to a request for access of a previously authenticated OS component 107a-107N to a previously encoded and locked manageability hardware component 101a-101N, reprograms 304 the encoded memory map register 105-106 addressing the requested manageability hardware component 101a-101N with a proper address and relocks its bus configuration space 103-104.

The encoding 302 of the memory map registers 105-106 with an encoded address can be done in different ways. In some examples, the memory map registers 105-106 may be encoded with all zeroes. In other examples, the memory map registers 105-106 may be encoded using transposition functions which in turn uses a hash table containing addresses for which exception handlers are defined either in the host or end point computing device. At every boot time, the hash table may be populated with some parts of unused address space and then each memory map register can be programmed by indexing it to an entry to the hash table. The index can be derived using a formula (random number % size) of hash table.

In the example of FIG. 3, the authentication of the OS component 107a-107N may be carried out by a boot firmware authenticator module 110 in the boot firmware engine 109 and a corresponding OS component authentication module 108a-108N in the OS component 107a-107N. The OS component authentication process may be implemented in the boot firmware authenticator module 110 in different ways. For example, the boot firmware authenticator module 110 may use a digital signed nonce generated by the boot firmware engine 109 using a trusted public and private key; by using a platform specific shared secret key or may verify a signature of the OS component 107a-107N loaded in memory using a public key stored in the boot firmware authentication module 110.

In such example, the method 300 provides on-demand access to manageability hardware component 107a-107N with the reprogrammed memory map register 105-106 only when said access is requested by authenticated OS component 107a-107N. The manageability hardware components that have not been requested to be accessed by authorized OS components remain protected with locked and encoded bus configuration spaces.

Figure 4:
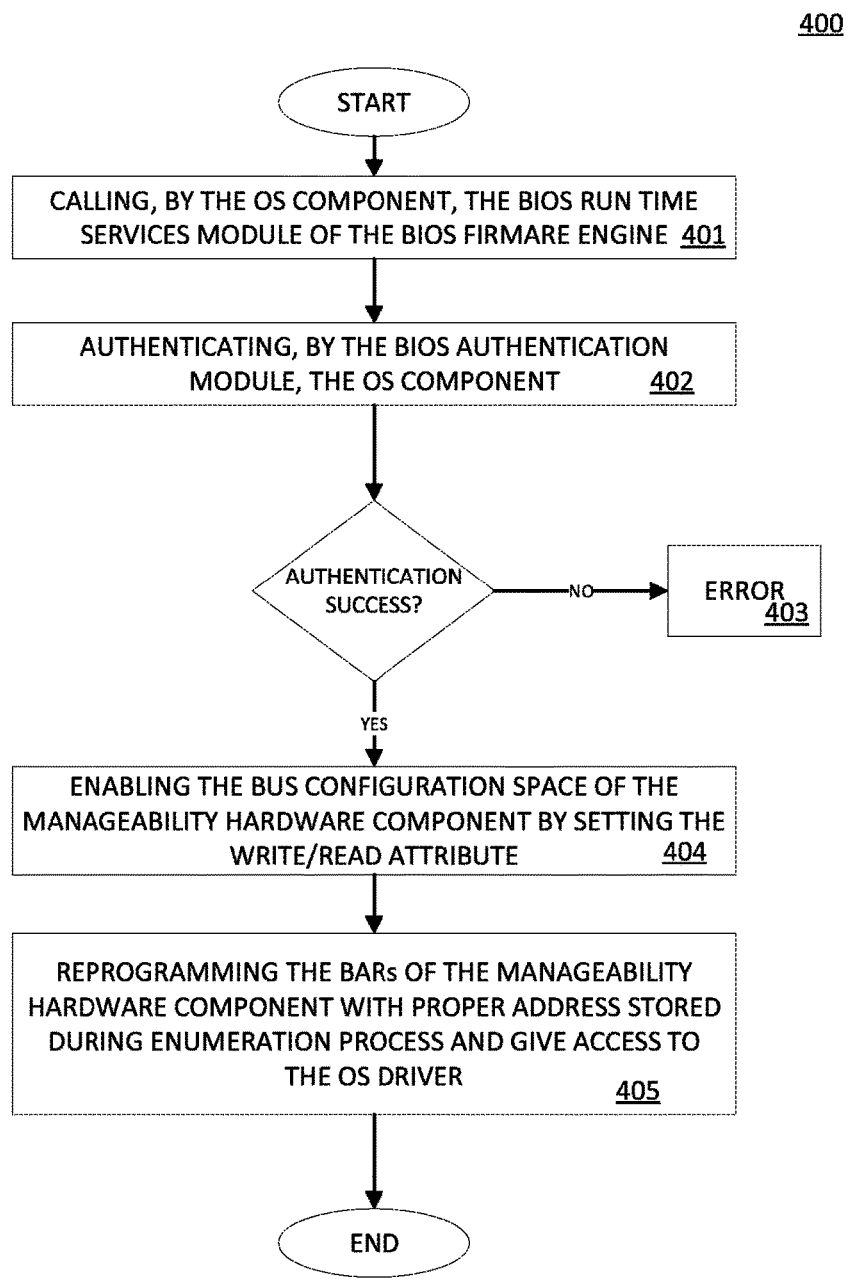
FIG. 4 is a flowchart of an example method to authenticate an OS kernel driver by the BIOS authenticator module.

FIG. 4 is a flowchart of an example method to authenticate an OS component by the BIOS authenticator module of the BIOS firmware engine. Although execution of method 400 is described below with reference to computing device 200 of FIG. 2, other suitable systems for the execution of method 400 may be utilized. Additionally, implementation of method 400 is not limited to such examples. The authentication process may be carried out at either install time or at load time of the OS component in the OS.

In such example, the OS driver 203 calls 401 the BIOS run time services module 207 of the BIOS firmware engine 202 by sending a digital signature of the driver authentication module 211. The BIOS run time services module 207 authenticates 402 the received digital signature using different techniques. In some examples, the BIOS run time services module 207 may use a digital signed nonce generated by the BIOS firmware engine 202 that employs a trusted public and private key. In other examples, the BIOS run time services module 207 may use a platform specific shared secret key. This secret key maybe shared with the OS driver 203 during the install time of the OS driver 203, such that for subsequent reboots/operations, the OS driver 203 may have to authenticate to the BIOS run time services module using this key. In some other examples, the BIOS run time services module 207 may verify the digital signature of the OS driver 203, the digital signature being loaded in memory, using a public key stored in the BIOS authentication module 208.

In the example of FIG. 4, when the authentication process 402 is not successful, the OS driver 203 is not allowed to access the requested manageability hardware component maintaining it locked. Then an "error" message is generated 403 and an exception signal may be also generated. The BIOS exception handler engine 210 may also send a message to the manageability firmware module 206 of the manageability hardware component 204 reporting the unauthorized attempt to access and log an event through a management processor of the computing device 200, in addition to informing the user of the unauthorized attempt to access by the specific unauthorized OS component or OS malware. When the authentication process 402 is successful, the BIOS firmware engine 202 enables 404 the PCIe configuration space 205 of the manageability hardware component by setting its attribute as a Write/Read attribute and then, reprograms 405 the BARs of the manageability hardware component with a proper address that was stored during the enumeration process for the OS driver 203 to operate. This provides full access to the manageability functions of the reprogrammed manageability hardware component 204 to the authorized OS driver 203. This authentication process may be also performed by the OS application 214, or any other OS driver, application or utility that is run by the OS on demand.

Figure 5:
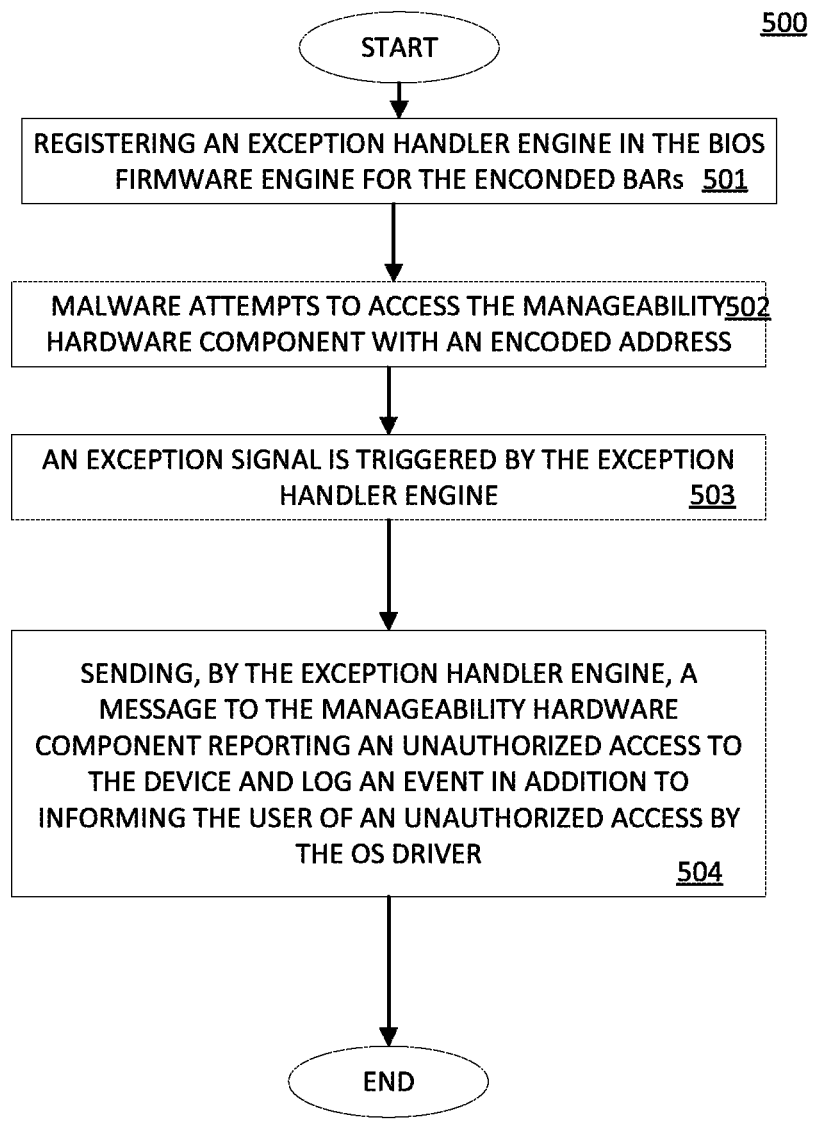
FIG. 5 is a flowchart of an example method to generate an exception signal in response to an attempt to access an encoded configuration address space of a manageability hardware component by OS malware.

FIG. 5 is a flowchart of an example method to generate an exception signal in response to an attempt to access an encoded bus configuration space of a manageability hardware component by OS malware. Although execution of method 500 is described below with reference to computing device 200 of FIG. 2, other suitable systems for the execution of method 500 may be utilized. Additionally, implementation of method 500 is not limited to such examples.

At 501 of the method 500, a BIOS exception handler engine 210 is registered for the encrypted/obfuscated addresses that are programmed to the BARs of the PCIe configuration address space 205. The BIOS exception handler engine 210 is the component that manages registering exception handlers for one or more manageability hardware components. In such example, there may be one BIOS exception handler engine 210 for a set of manageability hardware components with potentially one or more exception handlers. When malware or any unauthorized driver tries to write 502 to the manageability hardware component 203 using the encoded BAR addresses, an exception signal is triggered by the exception handler engine 210. Then, the exception handler engine 210 sends 504 a message to the manageability hardware component 204 reporting an unauthorized access to the component 204 and log an event in addition to informing the user of an unauthorized access by application/driver/utility.

In example described herein, exception handler engine 112 and BIOS exception handler engine 210 may be any combination of hardware and programming to implement the functionalities of engines 112,210 described herein. In other examples, the functionalities of any engine 112,210 may be at least partially implemented in the form of electronic circuitry. In some examples, functionalities described herein in relation to FIG. 2 may be provided in combination with functionalities described herein in relation to any of FIGS. 1 to 6.

Figure 6:
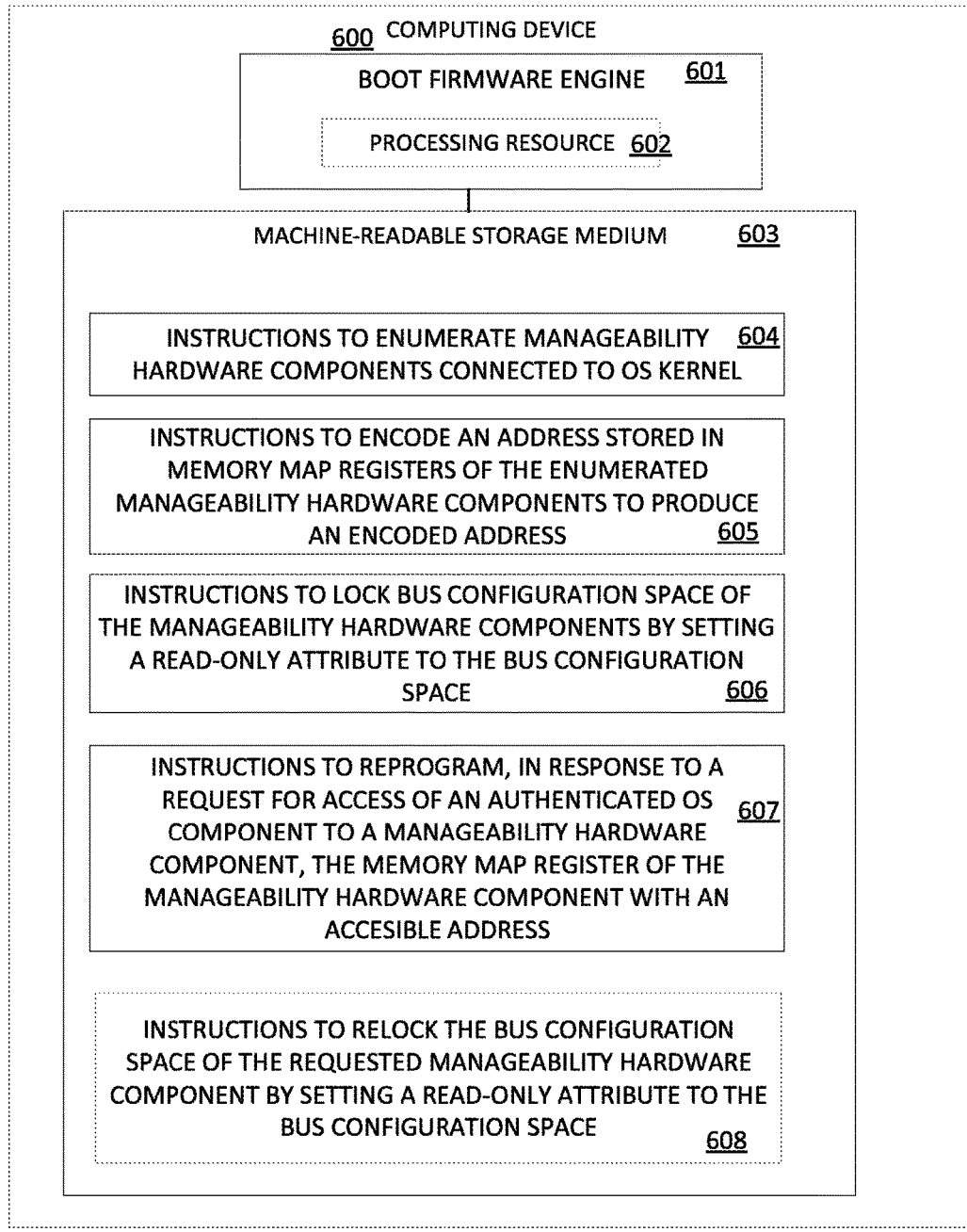
FIG. 6 is a block diagram of an example computing device including authenticated access to the manageability hardware components that relocks the configuration address space of the manageability hardware components to which access is granted.

FIG. 6 is a block diagram of an example computing device including authenticated access to the manageability hardware components that relocks the bus configuration space of the manageability hardware components to which access is granted. Although the example computing device 600 is described with reference to components comprised in computing device 100 of FIG. 1, other suitable computing devices to execute the instructions 604-608 may be utilized (e.g., the computing device 200 of FIG. 2). Additionally, implementation of computing device 600 is not limited to such examples.

Computing device 600 comprises a boot firmware engine 601, that in turn comprises a processing resource 602, and a machine-readable storage medium 603 comprising (e.g., encoded with) instructions 604-608. Instructions 604-608 are executable by processing resource 602 to implement functionalities described herein in relation to FIGS. 1 to 6. In some examples, storage medium 603 may include additional instructions. In other examples, the functionalities described herein in relation to instructions 604-608, and any additional instructions described herein in relation to storage medium 603, may be implemented at least in part in electronic circuitry (e.g., via engines comprising any combination of hardware and programming to implement the functionalities of the engines, as described below). Computing device 600 may include network interface device(s) to communicate with other computing resource(s) (e.g., computing device(s)) via at least one computer network. As described herein, a computer network may include, for example, a local area network (LAN), a virtual LAN (VLAN), a wireless local area network (WLAN), a virtual private network (VPN), the Internet, or the like, or a combination thereof.

In the example of FIG. 6 the processing resource 602 executes instructions to enumerate 604 a set of manageability hardware components 101a-101N connected to the OS kernel 102 of the computing device 600, the manageability hardware components 101a-101N comprising a bus configuration space 103-104 to connect with the OS kernel 102 and the bus configuration space 103-104 comprising memory map registers 105-106; to encode 605 an address stored in the memory map registers 105-106 of each of the enumerated manageability hardware components 101a-101N to produce an encoded address to control unauthorized accesses; to lock 606 the bus configuration space 103-104 of each manageability hardware component 101a-101N by setting a read-only attribute to the bus configuration space 103-104; to reprogram 607, in response to a request for access of an authenticated OS component 107a-107N to a particular enumerated manageability hardware component 101a-101N, the memory map register 105-106 of the requested manageability hardware component 101a-101N to provide the authenticated OS component 107a-107N with access to the particular enumerated manageability hardware component 101a-101N; and to relock 608 the bus configuration space 103-104 of the requested manageability hardware component 101a-101N by setting a read-only attribute to the accessible bus configuration space 103-104.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions 604-608, may be part of an installation package that, when installed, may be executed by processing resource 602 to implement the functionalities described above. In such examples, storage medium 603 may be a portable medium, such as a CD, DVD, or flash drive, or a memory maintained by a server from which the installation package can be downloaded and installed. In other examples, instructions 604-608 may be part of an application, applications, or component(s) already installed on computing device 600 including processing resource 602. In such examples, the storage medium 603 may include memory such as a hard drive, solid state drive, or the like.

Although the flowchart of FIG. 3-5 shows a specific order of performance of certain functionalities, methods 300,400, 500 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

Combining a locking mechanism for the bus configuration space of the manageability hardware components of a computing device, encryption/obfuscation of the memory map addresses of the bus configuration space and an authentication method to provide authorized access to the manageability hardware components of the computing device, a solution that enhance security of the manageability hardware and protect the hardware components from being manipulated by any OS malware that can cause PDoS attacks on the computing devices, is provided.

The solution herein described present many advantages, including an improvement in security of computing devices reducing the risk of PDoS attacks to brick hardware using OS malwares. Malware or unauthorized OS components without authentication from boot firmware cannot access the computing device thereby helping protect the core hardware components from PDoS attacks and making the overall solution more secure. Other advantages are that the solution is cost effective since the boot firmware engine of the computing device is defined as the control point to authenticated access to manageability hardware components and that the solution combines the concept of obfuscated BARs and the need for authorizing specific OS components, such as drivers and applications, using an boot firmware authentication module to access critical hardware devices required to maintain the integrity of the platform can be extended to other device drivers that can access core hardware components like EEPROM, voltage regulator modules etc., and the proposed solution helps protect the configuration space of core hardware devices and protect from reprogramming by any unauthorized drivers and applications.

We claim:

1. A method comprising:
    enumerating, by a boot firmware engine of a computing device, a set of manageability hardware components connected to an operative system kernel of the computing device, each of the manageability hardware components comprising a bus configuration space to connect with the operative system kernel and the bus configuration space comprising memory map registers;
    encoding, by the boot firmware engine, an address stored in a the memory map register of each of the enumerated manageability hardware components to produce an encoded address;
    locking, by the boot firmware engine, the bus configuration space of each of the manageability hardware components by setting a read-only attribute to the bus configuration space; and,
    in response to a request for access of an authenticated OS component to a particular enumerated manageability hardware component, reprogramming, by the boot firmware engine, the memory map register of the particular enumerated manageability hardware component with an accessible address.

2. The method of claim 1, comprising authenticating, by the boot firmware engine, the OS component at least by one of: using a digital signed nonce generated by the boot firmware engine using a trusted public and private key; using a platform specific shared secret key; or verifying a signature of the OS component loaded in memory using a public key stored in a boot firmware authentication module.

3. The method of claim 1, wherein reprogramming the memory map register of the particular enumerated manageability hardware component comprises relocking the bus configuration space of the particular enumerated manageability hardware component by setting a read-only attribute to the bus configuration space.

4. The method of claim 1, comprising generating, by an exception handler engine, an exception signal in response to a writing operation of an unauthorized OS component attempting to access to one of the memory map registers with encoded addresses.

5. The method of claim 4, comprising sending, by the exception handler engine, a message reporting the writing operation to the manageability hardware component by sending a message and logging an event through a management processor of the computing device.

6. The method of claim 1, wherein encoding each one of the memory map registers of the enumerated manageability hardware components comprises using a random encoding key that is generated at every booting process.

7. The method of claim 1, wherein enumerating the manageability hardware components comprises:
assigning, by the boot firmware engine, a configuration address space to each one of the manageability hardware components connected to the OS kernel of the computing device;
programming the bus configuration space of the manageability hardware component by assigning an address to the memory map registers of each manageability hardware component; and,
storing the programmed bus configuration space of the computer bus system and the assigned address in a memory of the computing device.

8. The method of claim 7, wherein reprogramming the memory map register of the particular enumerated manageability hardware component with the accessible address comprises assigning the stored and assigned address space corresponding to the requested manageability hardware component as the accessible address.

9. The method of claim 1, wherein a computer bus system of the bus configuration space is a Peripheral Component Interconnect Express (PCIe) interface and the memory map registers are Base Address Registers (BARs).

10. A system comprising:
a set of manageability hardware components connected to an Operative System (OS) kernel of a computing device, each of the manageability hardware components comprising a bus configuration space to connect with the OS kernel and the bus configuration space comprising memory map registers;
a boot firmware engine of the computing device to enumerate manageability hardware components, encode an address stored in a the memory map register of each of the enumerated manageability hardware components to produce an encoded address, lock the bus configuration space of each manageability hardware component by setting a read-only attribute to the bus configuration space, and in response to a request for access of an authenticated OS component to a particular enumerated manageability hardware component, reprogram the memory map register of the particular enumerated manageability hardware component with an accessible address; and,
an exception handler engine to generate an exception signal in response to a writing operation of an unauthorized OS component attempting to access to one of the memory map registers with encoded addresses.

11. The system of claim 10, wherein the manageability hardware components comprise architected registers to set attributes that are mapped to the memory map register of the bus configuration space and are programmable by a boot firmware authentication engine, the architected attributes comprising at least one of a read-only attribute, a read and write attribute, or a hide attribute.

12. The system of claim 10, comprising a boot firmware authentication engine to, in response to an authentication request of an OS component, authenticate the OS component at least by one of: using a digital signed nonce generated by the boot firmware engine using a trusted public and private key; using a platform specific shared secret key; or verifying a signature of the OS component loaded in memory using a public key stored in the boot firmware authentication engine.

13. The system of claim 10, wherein the computer bus system of the bus configuration space is a Peripheral Component Interconnect Express (PCIe) interface and the memory map registers are Base Address Registers (BARs).

14. An article comprising at least one non-transitory machine readable storage medium comprising instructions executable by a processing resource of a boot firmware engine of a computing device to:
enumerate a set of manageability hardware components connected to an operative system kernel of the computing device, each of the manageability hardware components comprising a bus configuration space to connect with the operative system kernel and the bus configuration space comprising memory map registers;
encode an address stored in a memory map register of each of the enumerated manageability hardware components to produce an encoded address;
lock the bus configuration space of each of the enumerated manageability hardware components by setting a read-only attribute to the bus configuration space;
in response to a request for access of an authenticated OS component to a particular enumerated manageability hardware component, reprogram the memory map register of the particular enumerated manageability hardware component with an accessible address; and,
relock the bus configuration space of the particular enumerated manageability hardware component by setting a read-only attribute to the bus configuration pace.

15. The article of claim 14, comprising instructions to generate an exception signal in response to a writing operation of an unauthorized OS component attempting to access to one of the memory map registers with encoded addresses.

* * * * *